Patented Nov. 26, 1935

2,022,606

UNITED STATES PATENT OFFICE 2,022,606

BROWN DISAZO DYES

Francis H. Smith, Woodstown, N. J., assignor to E. I. du Pont de Nemours & Company, Wilmington, Del., a corporation of Delaware No Drawing. Application June 8, 1934, Serial No. 729,720

14 Claims. (Cl. 260—76)

This invention relates to brown disazo dyes and a process for the production thereof.

The dye known as Basic Brown G (Color Index #331), which is one of the earliest so-called aniline dyes to find commercial use, was discovered by Martius in 1863 and was patented by Dale and Caro in the same year. In 1866 the dye was brought into commercial use by Roberts, Dale and Company. Caro and Griess (Zeit. f. Chem. (1867) 3, 278) undertook a scientific investigation of the color and considered it to be triamido-azobenzene. Schultz (Steinkohlenthiers 2 auf. 2, 193) gave it the following constitution:

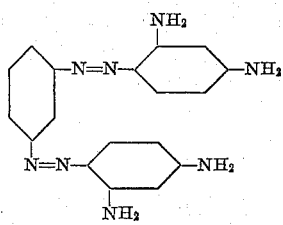

However, it was early recognized that the color as produced by the methods in vogue was not a definite chemical compound but a mixture of dyes of varying constitution. (Tauber & Walder, Ber. 30, 2111, 2890 (1897): Caro & Griess loc. cit.)

A definite process for preparing the color was early developed, starting with meta-dinitrobenzol. The following, which appears in Schultz, "Chem. des Steinkohlenthiers", Ed. 3, II, 119 (1901), may be taken as typical:

"250 kg. m-dinitrobenzol are reduced in 1000 liters water with iron and 35 kg. hydrochloric acid until the meta-nitraniline first formed disappears. It is then filtered and the solution made up to about 5000 liters. To the solution one adds a solution of 42.5 kg. sodium nitrite and 127.5 kg. hydrochloric acid. From the brown solution obtained in this way, the color is salted out with common salt and purified by again dissolving in water and re-salting."

It will be noted that no mention is made of operating temperatures, rates of addition of the reagents or any control of end points. The starting point for the preparation is meta-dinitrobenzene and the molar ratio of this compound to the sodium nitrite employed is approximately 2.5 to 1.

This same method of preparation is given in the latest edition of Enzyklopaeider Technischer Chemie (Ullmann) 2 auf. 395 (1928) with the same wording.

Ullmann appears to have overlooked the technical information published by H. E. Fierz in his "Farbenchemie" published in Zurich in the year 1920. On pages 150–151 is found a brief discussion of the chemistry of this color, together with a process for preparing the R brand from toluylene diamine. This process as given may be translated into English as follows:

"36.6 grams (0.3 mole) pure toluylene diamine are dissolved in 1 liter of water at 40° C. and, after cooling, the solution is mixed with 16.5 grams (0.249 mole) of 100% sodium nitrite. The volume is then made up to 1600 cubic centimeters with ice and 60 grams concentrated hydrochloric acid mixed with 60 cubic centimeters of water is added under the surface of the liquid within twenty minutes with continuous agitation. The solution immediately becomes deep brown and gives off a considerable amount of nitrogen. The final temperature is about 10° C. After eight hours, the dye is salted out with 300 grams common salt, filtered after three hours, and the extremely readily soluble dye is rinsed on the filter with its mother liquor. It is dried at a low temperature (vacuum in the industry) and weighs, when dry, about 50 grams. The equation for the reaction is given as:

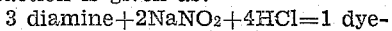
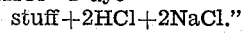

3 diamine+2NaNO$_2$+4HCl=1 dyestuff+2HCl+2NaCl."

It will be noted, however, that the amounts of diamine, sodium nitrite, and acid given in the above process do not agree with those specified in the above equation. This discrepancy is explained by Fierz on page 150 where he states that the dyes are mixtures of different dyes in which the product represented by the following structural formula is only the preponderant one:

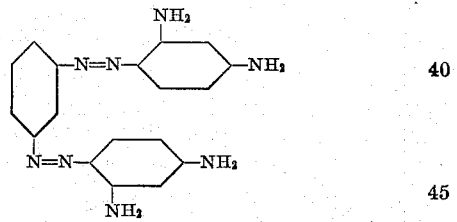

He further states that more sodium nitrite is used than would be required to satisfy the above equation. In the case of m-phenylene diamine about 24% excess is required, while with toluylene diamine about 20% excess over theory is used. Fierz goes on to say that the recipes found in the literature are of little value, since these invariably treat an acid diamine solution with sodium nitrite.

An examination of the literature briefly quoted above, shows that up to this time methods for producing this color have changed but little since first disclosed by the original inventors over sixty years ago. These methods do not produce a uniform, homogeneous product but a mixture of widely varying composition. This, as has been noted, was known and admitted by the earlier authors discussing the process.

With a view to avoiding the disadvantages of the prior art, it is an object of the present invention to produce new and improved brown disazo dyes. A further object is the provision of a new and improved process for producing such dyes. Other objects will appear hereinafter.

In accomplishing these objects according to the present invention, brown dyes are produced by adding a diazotizing acid to a mixture of water, sodium nitrite and a diamine having the following formula

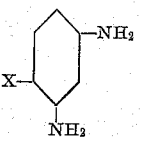

in which X represents hydrogen or alkyl, in the continuously maintained presence of a salting-out agent. The regulation of temperature, dilution, amount of acid, rate of addition of certain reagents and the proportions thereof facilitates the production of high quality products. Contrary to expectation, this reaction can be carried out on a commercial scale to give a balance showing no nitrous acid or diazo and only a slight excess diamine in spite of the presence of the simultaneously formed disazo dye which carries four free amino groups.

The reaction is complete in a comparatively short time from the time of beginning the addition of the diazotizing acid, and the dye can be filtered at once in the customary manner.

This invention discloses for the first time processes and conditions for producing the disazo body having the following constitution and the free base thereof, essentially free from other products such as decomposed diazo, diazo-amino, amino-azo or more complex azo compounds

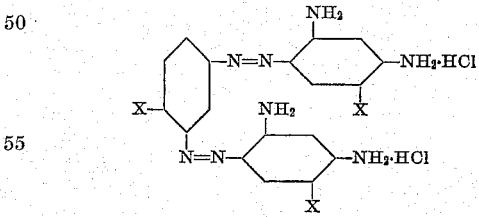

in which X represents either hydrogen or an alkyl group.

The invention will be further illustrated, but is not limited, by the following examples, in which the quantities are stated in parts by weight.

Example I

To a solution of 493 parts of 100% meta-phenylene diamine add 194 parts of 100% sodium nitrite solution. By adding ice and water as required, adjust the temperature to 16° C. and the total volume to a weight of 8500 parts.

With this adjustment made, add as rapidly as possible to the above combination, under constant agitation, 3000 parts of common salt. Continuing the agitation, immediately start the addition of a dilute solution of hydrochloric acid containing 194 parts of 100% acid and 650 parts of water, the temperature preferably being about 16° C. to about 31° C. The charge may now be prepared for filtration by an addition of hydrochloric acid until a test by Congo red shows a distinct excess of mineral acid. The color is still completely out of solution and there should be a distinct excess of meta-phenylene diamine. The preparation of the dye is now complete and the charge is blown rapidly to the filter press.

Aside from the customary dye test for shade strength and brightness, the quality of the color is further proved by testing its solubility as follows:

Five-tenths (0.5) part of the dry, crude dye is dissolved in 500 parts of water at 95° C. to 100° C. This solution is filtered at once through a 110 mm. #50 Whatman filter paper on a Buchner funnel with vacuum. The total filtration time should be less than one minute. The filter paper should be bright and should show but a slight clouding from insoluble matter. The amount of residue shown by this test and the time for filtration has been found to be one of the most illuminating methods yet devised for judging the quality of the product. Color made by the prior art methods has been found to leave a very heavy, black residue and to require from thirty minutes to twelve hours for filtration.

Example II

Dissolve 382 parts of 100% meta-toluylene diamine in 1500 parts of water at 85° C. Add this solution to approximately 5000 parts of water and add, with agitation, 137 parts of sodium nitrite. Add ice to adjust the temperature to 17° C. at a volume of 8000 parts. Now add 2400 parts of common salt rapidly and at once start adding in a steady stream 144 parts of 100% hydrochloric acid as an 18.5% solution with good agitation. There should be no test for free diazo. The dye, at this point, should be so completely out of solution that a spot on filter paper should show only a slight bleed-out of dissolved color. The test for the presence of free mineral acid (Congo red test) should be negative. The charge is now prepared for filtration by converting the dye to the form of the dihydrochloride by the addition of further amounts of hydrochloric acid until the reaction on Congo red test paper shows a distinct acidity. The dye is filtered at once in the usual manner.

Whereas the prior art processes are attended by side reactions, the process of the present invention is comparatively free from side reactions. The evolution of nitrogen, admitted by Fierz, does not characterize the procedures of the above examples.

The proportions of salting-out agent may vary widely but should preferably be sufficient to precipitate the dye substantially as fast as formed.

The preferred proportions of sodium nitrite in the present process are slightly less than two molecular equivalents for each three molecular equivalents of diamine, as contrasted with an excess of 20% to 24% over the theoretical amount used by Fierz. An additional amount of sodium nitrite may be added, if necessary, to give an exact balance showing a very slight excess of diamine and no nitrite.

While the concentration of the reactants is subject to variation, especially desirable results have been obtained by carrying out the reaction with such proportions of reactants that the total concentration of sodium nitrite, water and diamine is approximately 1860 parts by weight per mole (108 parts) of metaphenylene diamine and about 2550 parts by weight per mole (122 parts) of meta-toluylene diamine. The Fierz process uses a concentration of slightly over 5000 parts per mole of meta-toluylene diamine.

The yields of color by the present process are higher than by the prior art. Assuming the color strength to be the same, the yield of crude dye from meta-toluylene diamine is about 23% higher in the process of the present invention than that according to the disclosure of Fierz. Moreover, on the basis of actual increase in tinctorial power the yields according to the present process are even higher.

The improvement in quality measured by shade, brightness, strength and solubility secured by the present process over that of the prior art is so marked that the former product is not saleable on a competitive basis. Brightness and solubility are the two qualities of critical value. The former product is very dull. It also contains much insoluble matter. The test described in detail with the above examples demonstrates this critical difference. The filter paper from the filtration of 0.5 gram of dye as prepared in the examples is bright orange-brown in color and free from retained insoluble matter, while color prepared by prior art methods will leave a heavy, tar-like, brownish-black residue and the paper on its reverse side will be dull and a darker brown in shade. It is obvious that prior art dye, which is dull in shade and contains insoluble matter, cannot be substituted for dye bright in shade and free from insoluble matter, such as is produced by the process herein described.

As many apparent and widely different embodiments of this invention may be made without departing from the spirit and scope thereof, it is to be understood that I do not limit myself to the specific embodiments thereof, except as defined in the appended claims.

I claim:

1. The process of producing a brown disazo dye which comprises adding a diazotizing acid to a mixture of water, sodium nitrite and a diamine having the following formula:

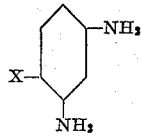

in which X represents hydrogen or alkyl, in the continuously maintained presence of a salting-out agent in sufficient amount to salt out the dye substantially as fast as it is formed.

2. In a method of preparing a brown disazo dye by a process involving simultaneously diazotizing and coupling a diamine having the following formula:

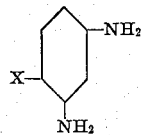

in which X represents hydrogen or alkyl, the steps which comprise carrying out the diazotization and coupling at a temperature within the range of about 16° C. to about 31° C. and in the presence of sufficient salting-out agent to salt out the dye substantially as fast as it is formed.

3. The process of producing a brown disazo dye which comprises adding sodium nitrite to an aqueous solution of meta-phenylene diamine in proportions slightly less than two molecular equivalents of sodium nitrite for each three molecular equivalents of the diamine, then adding a salting-out agent in sufficient amount to salt out the dye substantially as fast as it is formed, and subsequently simultaneously diazotizing and coupling, and separating the dye.

4. The process of producing a brown disazo dye which comprises adding sodium nitrite to an aqueous solution of meta-toluylene diamine in proportions slightly less than two molecular equivalents of sodium nitrite for each three molecular equivalents of the diamine, then adding a salting-out agent in sufficient amount to salt out the dye substantially as fast as it is formed, and subsequently simultaneously diazotizing and coupling, and separating the dye.

5. The process of claim 3, in which the concentration of the mixture of water, sodium nitrite and meta-phenylene diamine corresponds to a total weight of about 1860 parts per mole of the diamine.

6. The process of claim 4, in which the concentration of the mixture of water, sodium nitrite and meta-toluylene diamine corresponds to a total weight of about 2550 parts per mole of the diamine.

7. The process of producing a brown disazo dye which comprises adding to an aqueous solution of meta-phenylene diamine slightly less than two molecular equivalents of sodium nitrite for each three molecular equivalents of the diamine, then adding as rapidly as possible under constant agitation a sufficient amount of salt to salt-out the dye upon diazotization and coupling, adding a dilute solution of hydrochloric acid to the resultant mixture in such amount that a slight excess of free meta-phenylene diamine remains, and after diazotization and coupling adding a distinct excess of hydrochloric acid, and separating the dye as the hydrochloride.

8. The process of producing a brown disazo dye which comprises adding to an aqueous solution of meta-toluylene diamine slightly less than two molecular equivalents of sodium nitrite for each three molecular equivalents of the diamine, then adding as rapidly as possible under constant agitation a sufficient amount of salt to salt-out the dye upon diazotization and coupling, adding a dilute solution of hydrochloric acid to the resultant mixture in such amount that a slight excess of free meta-toluylene diamine remains, and after diazotization and coupling adding a distinct excess of hydrochloric acid, and separating the dye as the hydrochloride.

9. The process of claim 7 in which the temperature during the addition of the hydrochloric acid is within the range of about 16° C. to about 31° C.

10. The process of claim 8 in which the temperature during the addition of the hydrochloric acid is within the range of about 16° C. to about 31° C.

11. The process of producing a brown disazo dye which comprises adding to a solution of meta-phenylene diamine slightly less than two molecular equivalents of sodium nitrite for each three molecular equivalents of the diamine, adding ice and water as required to adjust the temperature to about 16° C. and the volume to a concentration corresponding to a total weight of about 1860 parts per 108 parts of the diamine, then adding as rapidly as possible under constant agitation a sufficient amount of salt to salt-out the dye upon diazotization and coupling, adding a dilute solution of hydrochloric acid to the resultant mixture in such amount that a slight excess of free meta-phenylene diamine remains, and after diazotization and coupling adding a distinct excess of hydrochloric acid, and separating the dye as the hydrochloride.

12. The process of producing a brown disazo dye which comprises adding to a solution of meta-toluylene diamine slightly less than two molecular equivalents of sodium nitrite for each three molecular equivalents of the diamine, adjusting the temperature to about 17° C. and the volume to a concentration corresponding to a total weight of about 2550 parts per 122 parts of meta-toluylene diamine, then rapidly adding sufficient salt to precipitate the dye upon diazotization and coupling, and immediately after addition of the salt adding a dilute solution of hydrochloric acid in such amount that there is a slight excess of meta-toluylene diamine, and upon completion of the diazotization and coupling converting the dye to the form of the dihydrochloride by the addition of further amounts of hydrochloric acid to a distinct acidity, and separating the dye as the hydrochloride.

13. In a process of preparing a brown disazo dye, the steps which comprise simultaneously diazotizing and coupling a diamine having the following formula:

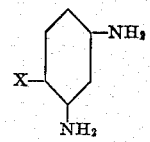

in which X represents hydrogen or alkyl, in the presence of a sufficient amount of a salting-out agent to salt out the dye substantially as fast as it is formed, and maintaining an excess of free diamine during the reaction.

14. In a process of preparing a brown disazo dye, the steps which comprise simultaneously diazotizing and coupling a diamine having the following formula:

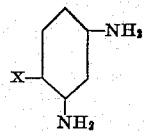

in which X represents hydrogen or alkyl, at a temperature within the range of about 16° C. to 31° C. in the presence of sufficient salting-out agent to salt out the dye substantially as fast as it is formed, and maintaining an excess of free diamine during the reaction.

FRANCIS H. SMITH.